(12) United States Patent
Bikerman et al.

(10) Patent No.: US 9,648,982 B2
(45) Date of Patent: *May 16, 2017

(54) TEA MACHINES

(71) Applicants: David Bikerman, New York, NY (US); Thomas Muckle, Old Lyme, CT (US)

(72) Inventors: David Bikerman, New York, NY (US); Thomas Muckle, Old Lyme, CT (US)

(73) Assignee: David Bikerman, NY, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/250,874

(22) Filed: Apr. 11, 2014

(65) Prior Publication Data

US 2016/0095462 A1    Apr. 7, 2016

(51) Int. Cl.
*A47J 31/40* (2006.01)
*A47J 31/46* (2006.01)

(52) U.S. Cl.
CPC ........... *A47J 31/462* (2013.01); *A47J 31/404* (2013.01)

(58) Field of Classification Search
CPC ........ A47J 31/462; A47J 31/404; A47J 31/18; A47J 31/36; A47J 31/007; A47J 31/42; A47J 42/50; A47J 31/52; A47J 31/3614; A23F 5/267; A23F 5/265; A23F 5/262; A23F 5/26; B65B 1/12; B65D 85/8043
USPC ............................... 99/289 R, 284, 280, 287
See application file for complete search history.

(56) References Cited

U.S. PATENT DOCUMENTS

| | | | | |
|---|---|---|---|---|
| 3,809,215 A | * | 5/1974 | Dobry | B65D 85/812 206/0.5 |
| 4,090,344 A | * | 5/1978 | Kelly | B65B 9/213 53/167 |
| 4,188,864 A | * | 2/1980 | Fischer | A47J 31/542 219/433 |
| 4,290,521 A | * | 9/1981 | Mitchell | B65D 85/808 206/0.5 |
| 4,417,433 A | * | 11/1983 | Mitchell | B65D 85/808 206/0.5 |
| 5,871,789 A | * | 2/1999 | Romagnoli | B65D 85/812 426/77 |
| 7,124,556 B2 | * | 10/2006 | Noumi | B65B 1/32 53/502 |
| 9,468,222 B2 | * | 10/2016 | Stewart | A23F 3/14 |

(Continued)

*Primary Examiner* — David Angwin
*Assistant Examiner* — Biniam Asmelash

(57) ABSTRACT

This disclosure relates to tea machines that utilize infusion bag dispensing systems to dispensing tea or other substances from canisters into the infusion bag. The tea machine comprises: a canister housing; one or more removable canisters, each canister configured to be refillable with loose tea and/or infusible sweetener; a plurality of empty infusion bags configured to contain tea and/or other infusible substance; an infusion bag dispenser adapted to hold a plurality of empty porous-walled infusion bags and configured to retrieve an empty infusion bag and hold and open the retrieved bag for filling with tea and/or other infusible substance; and a measuring cup adapted for determining the quantity of tea or other infusible substance to be extracted from the canister(s) and dispensed into the infusion bag. The tea machine of the present invention may be manually operated, or may be operated electronically, or may be controlled by a microprocessor or/and be programmed by the end user.

16 Claims, 7 Drawing Sheets

(56) References Cited

U.S. PATENT DOCUMENTS

| | | | |
|---|---|---|---|
| 2009/0095165 A1* | 4/2009 | Nosler | A47J 31/007 99/289 R |
| 2013/0074456 A1* | 3/2013 | Hradisky | B65B 39/06 53/473 |
| 2013/0095218 A1* | 4/2013 | de Graaff | A47J 31/42 426/433 |
| 2013/0192168 A1* | 8/2013 | Bracegirdle | B65B 1/02 53/451 |
| 2014/0314913 A1* | 10/2014 | Stewart | A47J 31/407 426/78 |

* cited by examiner

TEA MACHINES

BACKGROUND OF THE INVENTION

Field of the Invention

This invention relates generally to tea machines, and relates more particularly to tea machines utilizing an infusion bag dispensing system that can be used to make tea at home, within a store environment or within a work or office setting.

Description of Related Art

Infusion bags used for preparing tea, herbal beverages or the like are known in the prior art. More specifically, by way of example, U.S. Pat. No. 7,235,273 to Ruston discloses an infusion bag having a means for selectively inserting any desired dry beverage material.

U.S. Pat. No. 4,605,123 to Goodrum et. al. discloses an infusion bag for particulated food products such as tea, coffee and the like, constructed of a tube of perforated thermoplastic film or other porous material.

U.S. Pat. No. 6,746,699 to Lohrey et al. discloses an infusion bag especially for tea, which has a top part with folded down corners and a middle part folded over it, to which a string with two free ends is attached.

U.S. Pat. No. 4,551,336 to Chen discloses an improved infusion bag for preparing an infusion of tea or other infusible substance, which makes the infusible substance less compacted and overcomes the constraint. This gives a higher quantity and higher concentration of infusion liquor.

To package one's own infusion bags for tea, for herbal tea beverages, or the like for which separation of the infusible substance from liquid is desired often times results in a tedious and cumbersome process. Tradition is such that a person needs to get a sachet, hold it open, and transfer the desired infusible material into the sachet. Therefore, it is desirable to have a device, for example, an infusion bag dispenser, which can help to facilitate such packaging and remove the need for a preparation process that requires many ancillary items stored and employed by the end-user.

However, there is no infusion bag dispenser available for people to help or facilitate for them the packaging of their own infusion bags at home, within a store, or within a work setting—to prepare their own tea or herbal beverage or the like.

Therefore, there is a need for tea machines that utilize an infusion bag dispensing system for tea, herb leaves, and the like. Such a tea machine can store the empty infusion bags in a container, retrieve the bag, hold the bag and open the bag for a user to dispense the infusible substance from one or multiple canisters for use.

SUMMARY OF THE INVENTION

One primary object of the present invention is to provide a tea machine for tea, herb leaves, and the like which includes an infusion dispensing system that can dispense tea or herbal leaves from one or more tea or herbal canisters into an infusion bag for making tea or herbal tea drink.

Another object of the present invention is to provide an electronically operated tea machine.

Another object of the present invention is to provide a microprocessor controlled tea machine.

In order to reach the aforementioned objectives, the principle of the infusion bag dispensing system (See U.S. patent application Ser. No. 14/250,434, "infusion bag dispensing system", submitted on Apr. 11, 2014; the disclosure of which is incorporated herein by reference) is used in the infusion bag dispenser design of the present invention.

The tea machine of the present invention may be manually operated, or may be operated electronically, or may be controlled by a microprocessor or/and be programmed by the end user.

The tea machine of the present invention can dispense metered quantities of substances using weight or volume sensor. Alternatively, a user can estimate the quantity by looking at marking lines indicated on a measuring cup. The tea machine can dispense multiple substances, of same or different sizes (weight or volume), from one or more removable canisters into an infusion bag.

The tea machine can dispense sugar and/or other sweetener into an infusion bag. The tea machine can store a plurality of infusion bags, extract an infusion bag, open the Infusion bag, dispense metered quantities of multiple substances into the infusion bag, and dispense a filled infusion bag into a cup. The tea machine can dispense substance(s) of different size(s) into the Infusion bag.

The tea machine of the present invention can store water, heat water, and dispense hot water into a cup.

In an exemplary embodiment of the present invention, there is disclosed a tea machine for filling tea bags and making tea, the tea machine comprising: a canister housing; one or more removable canisters, each canister configured to be refillable with loose tea and/or infusible sweetener an infusion bag dispenser adapted to hold a plurality of empty infusion bags, such infusion bags having a porous-walled bag configured to contain tea and/or other infusible substance, an open/close clip, and two holes at two ends of the clip; a retriever and opener mechanism operable to retrieve the empty infusion bag individually from the infusion bag dispenser, hold and open the retrieved bag for filling with the infusible substance; and a measuring cup adapted for determining the quantity of tea or other infusible substance to be extracted from the canister(s) and dispensed into the Infusion bag.

In another embodiment, the tea machine further comprises control levers or control buttons to actuate the dispensing of substances from canisters to the measuring cup, and from measuring cup to the infusion bag.

In another embodiment, the tea machine further comprises microprocessor, user interface and computer display for allowing the user to create their own tea recipes and save the recipes for future use.

In another embodiment, the tea machine further comprises water tank or water inlet, and a water heater to add hot water to the cup to make tea.

The tea machine's measuring cup may utilize one of a weight sensor or volume sensor to measure the quantity of substances to be dispensed. Alternatively, the quantity is measured or estimated according to the marking lines indicated on the measuring cup.

In another embodiment, the tea machine further comprises a cup sensor or detector to ensure the presence of cup before releasing the filled infusion bag into the cup and before dispensing hot water into the cup.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

The tea machines according to the principle of the present invention utilize the principle of the infusion bag dispensing system (See U.S. patent application Ser. No. 14/250,434, "infusion bag dispensing system", submitted on Apr. 11, 2014; the disclosure of which is incorporated herein by reference).

Figure 1:
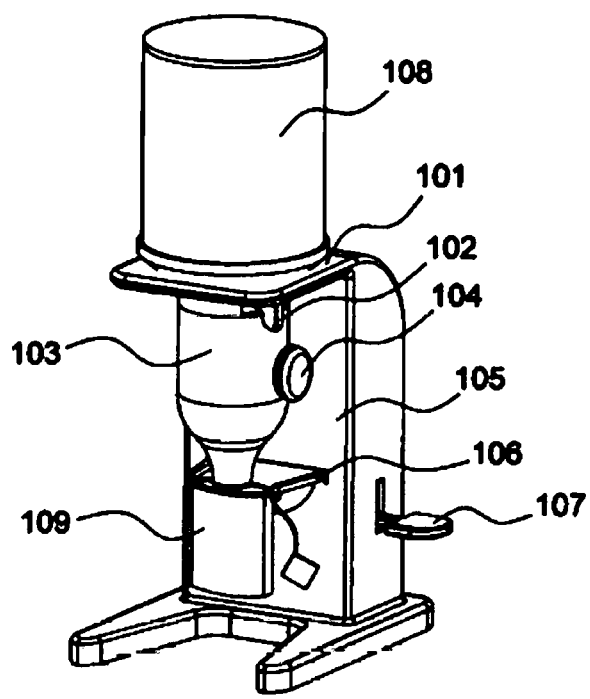
FIG. 1 is a perspective view of the single canister manual tea machine.

Referring to FIG. 1, there is disclosed the first embodiment of tea machine, the single tea canister manual tea machine 100. The single tea canister manual tea machine 100 has a canister housing 101, a release lever 102, measuring cup 103, measuring cup release knob 104, bag storage 105, bag opening mechanism 106, and bag dispenser lever 107. The measuring cup 103 may have marking lines to indicate quantity.

To use the single tea canister manual tea machine 100, the user opens a canister 108 and places the canister 108 onto the canister housing 101. The user uses the release lever 102 to release tea leaves into the measuring cup 103. The quantity can be measured or estimated by looking at the marking lines indicated on the measuring cup. Once the desired amount of tea is placed in the measuring cup 103, the tea release lever 102 is closed. The user then pushes down on the bag dispenser lever 107 to dispense the infusion bag 109. The infusion bag dispenser mechanism is described in patent application Ser. No. 14/250,434. The bag retrieving and opening mechanism 106 then opens up the bag for the user to turn the measuring cup release knob 104 to dispense the tea leaves from the measuring cup 103 to the infusion bag 109. After the tea leaves are placed inside the infusion bag 109, the infusion bag 109 is then closed and ready to be used. The bag retrieving and opening mechanism 106 can be returned to its original position by pulling the bag dispenser lever 107 up.

Figure 2:
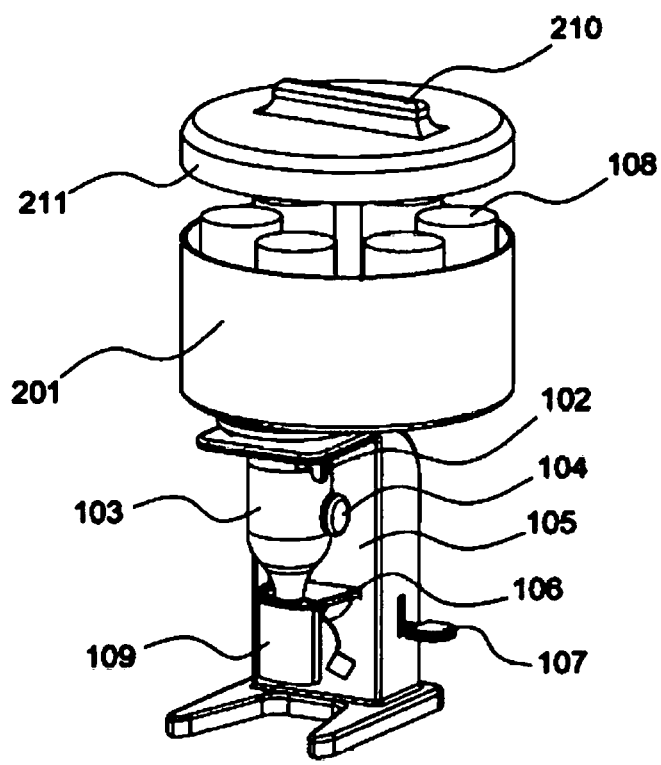
FIG. 2 is a perspective view of the multi canister manual tea machine.

Referring to FIG. 2, there is disclosed the second embodiment of tea machine, the multi canister manual tea machine 200. Multi canister manual tea machine 200 has a canister selector 210, canister housing 201, a canister housing lid 211, a release lever 102, measuring cup 103, measuring cup release knob 104, bag storage container 105, bag opening mechanism 106, and bag dispenser lever 107. The canister housing 201 contains multiple canister slots to hold the canisters (which may contain tea or sugar/sweetener) 108. To use the multi canister manual tea machine 200, the user opens a canister 108 and places the canister 108 onto one of the canister slots in the canister housing 201. User may continue to put additional canisters 108 into each of the remaining canister slots. The user can then use the canister selector 210 to rotate the canisters to the one the user wants to use. On the bottom of each canister slot is a hole that is closed off by a cover. The user uses the release lever 102 to open the cover to release tea or sugar/sweetener into the measuring cup 103. Once the desired amount of tea or sugar/sweetener is placed in the measuring cup 103, the release lever 202 is closed. At this point, the user can select another canister 108 to mix by turning the canister selector 210 to the desired canister 108 and follow the above steps again. The user then pushes down on the bag dispenser lever 107 to dispense the infusion bag 109. The bag retrieving and opening mechanism 106 is described in patent application Ser. No. 14/250,434. The bag retrieving and opening mechanism 106 then opens up the infusion bag 109 and is ready for the user to turn the measuring cup release knob 104 to release the tea leaves inside the measuring cup 103. After the tea leaves are placed inside the infusion bag 109, the infusion bag 109 is then closed and ready to be used.

Figure 3:
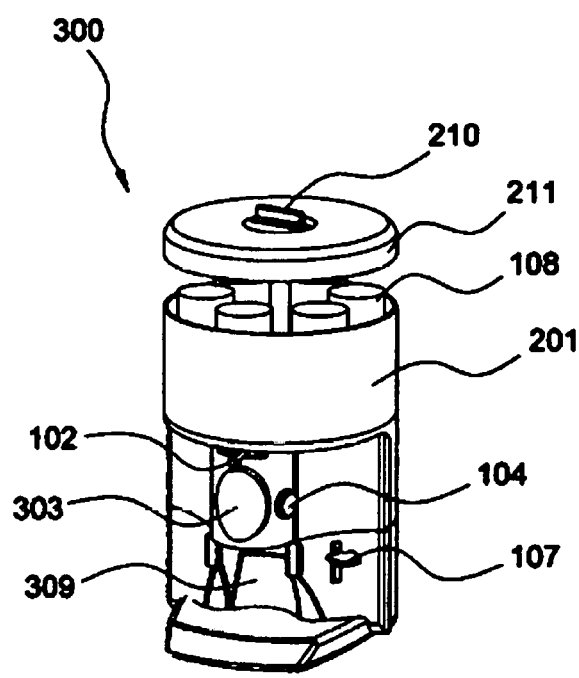
FIG. 3 is a perspective view of an alternative version of the multi canister manual tea machine.

Referring to FIG. 3, there is disclosed an alternative embodiment of the tea machine, the alternative multiple canister manual tea machine 300. The alternative multi canister manual tea machine 300 has a canister selector 210, canister housing 201 to hold canisters 108, a canister housing lid 211, a release lever 102, measuring cup window 303, measuring cup release knob 104, infusion bag dispenser 309, and bag dispenser lever 107. The alternative multiple canister manual tea machine 300 functions the same way as the multi canister manual tea machine 200. The measuring cup shown in FIG. 2 is covered by a plastic wall and is invisible in FIG. 3. However, there is a measuring cup window 303 through which to observe the quantity of the infusible substance in the measuring cup. The tea measuring cup window 303 is removable for cleaning. Also, the infusion bag dispenser 309 including the bag retrieving and opening mechanism 106 and the bag storage container 105 shown in FIG. 2 is surrounded by a plastic wall and is invisible in this figure. The infusion bag dispenser 309 is discussed in the patent application Ser. No. 14/250,434.

Figure 4:
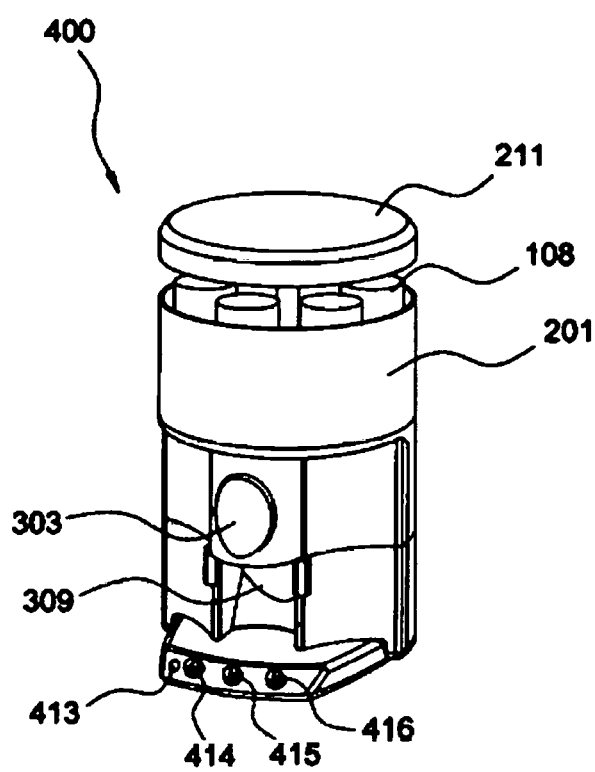
FIG. 4 is a perspective view of the electric multi canister tea machine.
Figure 5:
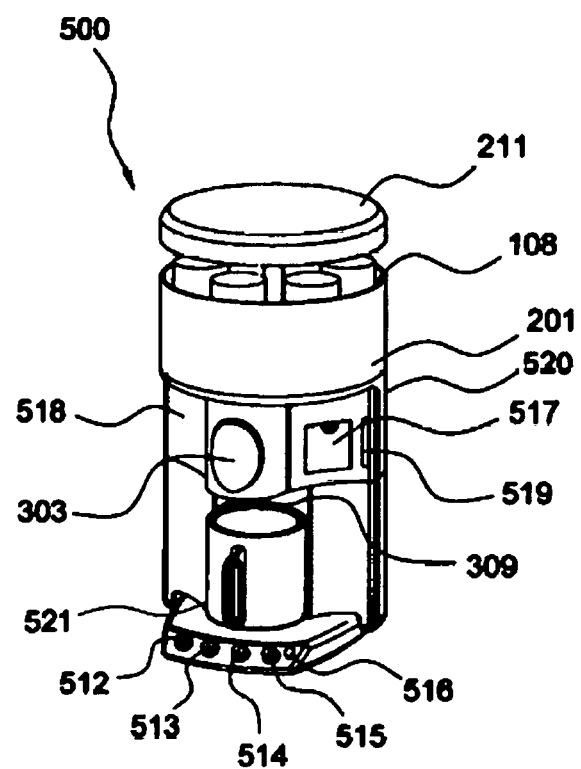
FIG. 5 is a perspective view of the electric multi canister with hot water tea machine.

Referring to FIGS. 4-5, there are disclosed another two embodiments of the tea machine, the multiple tea canister electric tea machine, one without water supply 400 and one with water supply 500. The user first presses the first or leftmost button 413 to turn the unit on. Once the unit is turned on, pressing the leftmost button 413 rotates the storage canisters by one position. The user presses the leftmost button 413 until their desired canister 108 is selected. The rotating mechanism inside the canister housing 201 may be any rotating mechanism known in the art. Instead of using bag dispenser lever 107, the second button 414 displaces an infusion bag 109 in the "to be filled" position. Instead of using the release lever 102, the third button 415 dispenses a fixed amount of tea into the measuring cup. In another embodiment, the selected tea leaves are dispensed while the user holds down the third button 415 and stops dispensing when the user lets go of the third button. For example, if the user wants to dispense 2 grams of tea leaves from the currently selected canister, the user holds down the third button 415 to dispense the tea leaves while monitoring the measuring cup window 303. Once the tea leaves fill up to the 2 gram mark in the measuring cup 103, the user releases the third button 415 to stop further tea leaves to be dispensed. If the user wants to select another tea to mix, he/she can press the first button 413 to rotate the canisters 108 and hit the second button 414 again to get a fixed amount of another tea. Instead of using measuring cup release knob 104 as shown in FIG. 3, the rightmost button 416 dispenses the tea from the measuring cup into the infusion tea bag 109. Pressing the rightmost button 416 again releases the "filled" infusion tea bag 109 and turns the electric tea machine 400 off. The configurations of the buttons and their functionality may be setup differently.

In addition to all elements of embodiment 400, the embodiment 500 disclosed in FIG. 5 further has a water supply which is a water tank 518 to store water, small opening 517 to manually fill water into the water tank 518, and a water level indicator 519. An additional rightmost or fifth button 516 is included that when pressed dispenses water. The embodiment may further comprise a heater 520 to heat water for making tea. In another embodiment, the water supply may be a water inlet which is connected to a water pipe and thus water is automatically supplied.

Figure 6:
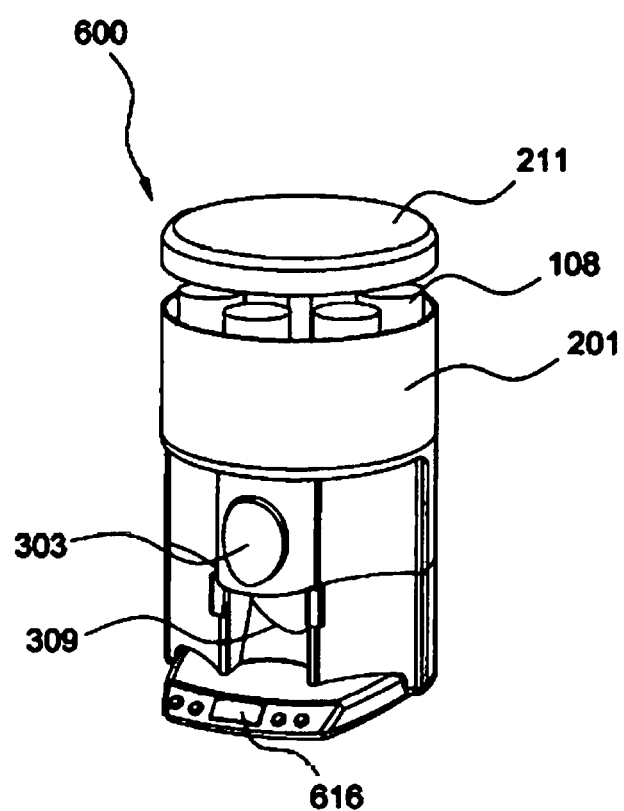
FIG. 6 is a perspective view of the computer controlled multi canister tea machine.
Figure 7:
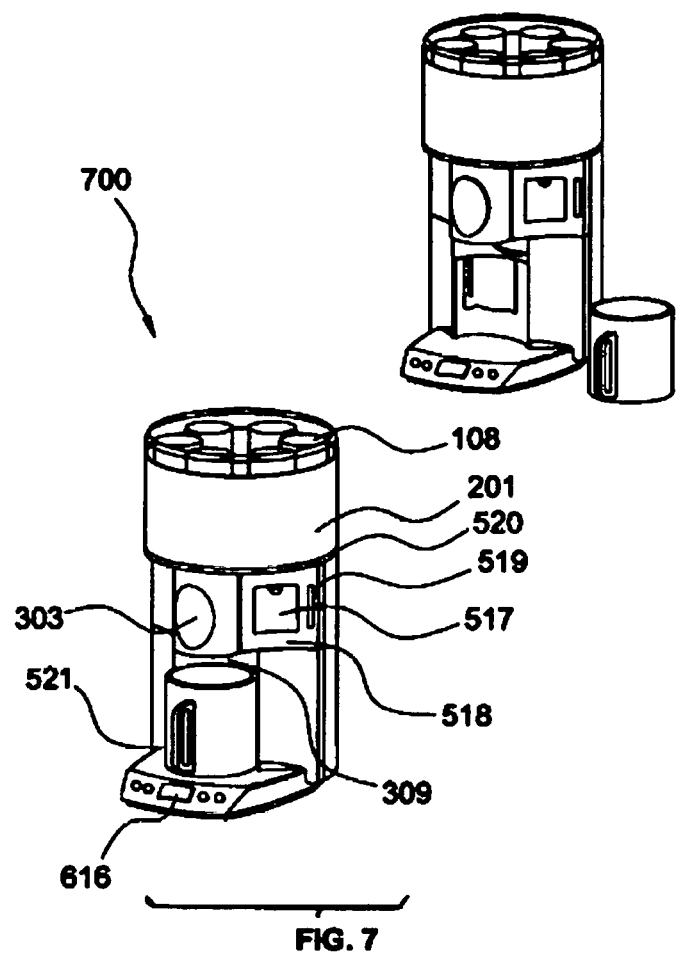
FIG. 7 is a perspective view of the computer controlled multi canister with hot water tea machine.

Referring to FIGS. 6-7, there are disclosed another two embodiments of the tea machine, the computer controlled tea machine, one without water supply 600 and one with water supply 700. The computer controlled tea machine 600 has one or more buttons, a small display screen 616 preferably a LCD screen, a microprocessor, and motorized tea selector 210. In FIG. 6, four buttons are shown as an example; the configurations of the buttons and their functionality may be setup differently. To start to use the tea machine 600, the user presses a button to turn on the computer controlled tea machine 600. The display 616 will provide two options: 1) select a pre made tea mixture recipe, 2) create new tea mixture recipe. If the user selects option #2 (by pressing on the button corresponding to option #2) create new tea mixture, the display 616 will ask the user to select the teas for the mixture by displaying all the types of tea. The user presses a button until the desired tea is selected. The computer display will ask the user to enter the amount for the tea. The amount can be input in many different ways. In one of the embodiments, the amount will start at 0.0. The user can press a button to increase the amount at a small preset increment and press another button to decrease the amount at a preset decrement. In another embodiment, the display may show several quantities and the user may use the buttons assigned for up (increase quantity) and down (decrease quantity) to select the quantity. The display 616 may ask whether to add additional tea leaves? To add additional tea leaves into the mixture, the user repeats the above steps. The user lets the computer controlled tea machine 600 know that the mixture is complete and to save the mixture recipe. There may be an option for the user to input a name for the mixture recipe using the buttons.

The computer controlled tea machine 600 will ask the user if they want the newly created tea mixture to be made into an infusion tea bag 109. If the user selects yes, the computer controlled tea machine 600 will open and dispense an infusion tea bag 109 and dispense the selected tea leaves until the weight or volume scale/sensor reaches the quantity that the user input. Repeating the process with each tea leaves input for the mixture until the tea mixture recipe is completed. Then the infusion tea bag 109 is closed, released, and ready to be used. Next time the user wants to make the same tea mix he/she selects #1 pre made tea mixture option and selects the saved pre made tea mixture recipe of their choice. If they want to make a tea with different recipe they can choose #2 create new tea mixture option and create a new pre-made tea mixture recipe to saved in the computer controlled tea machine 600.

In addition to all elements of embodiment 600, embodiment 700 disclosed in FIG. 7 further comprises a water tank 518 to store water, small opening 517 to fill water into the water tank 518, and a water level indicator 519. In another embodiment, the device can have water inlet connected to a water pipe to supply water. The device may also contain a water heater 520 to heat the water.

The electric tea machine with hot water 500 of FIG. 5 and the computer controlled tea machine with hot water 700 of FIG. 7 both have a cup sensor. The tea machine only dispenses hot water if the cup sensor detects a cup is present to prevent water from being dispensed when no cup is present.

Each embodiment of the device may dispense sugar and/or other sweetener or creamer into the infusion bag which may be stored in one of the canisters 108.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A tea machine for filling tea bags utilizing an infusion bag dispensing system, the tea machine comprising:
    a housing;
    an infusion bag dispensing system for packing infusion bags, the infusion bag dispensing system comprising in combination:
        a storage container adapted to store and hold a plurality of empty infusion bags;
        each of said infusion bags having a porous-walled bag for infusible substance; and
        a bag retrieving and opening mechanism to retrieve and open said infusion bag and to hold the opened infusion bag in a position to be filled with the infusible substance and release the filled infusion bag;
        wherein the infusion bag comprises an open/close mechanism to prevent the infusible substance from exiting the bag; wherein each of the infusion bags have has an open/close clip, and two holes at two ends of the clip; and a wherein said bag retrieving and opening mechanism that retrieves the empty bags one at a time for filling by attaching a pair of hooks or pins to the pair of holes at the open/close clip of the infusion bag; and wherein the open/close clip of the infusion bag opens when pressure is applied and closes when pressure is released;
    one or more removable canisters, each canister configured to be refillable with loose tea and/or other infusible substance; and
    a measuring cup adapted for determining the quantity of tea or other infusible substance to be extracted from the canister(s) and dispensed into the infusion bag.

2. The tea machine for filling tea bags of claim 1 further comprising:
    a bag dispenser lever to dispense an empty infusion bag ready to receive tea or other infusible substance;
    a release lever to dispense a quantity of tea or other infusible substance in the canister to the measuring cup; and
    a measuring cup release knob to dispense the tea and other infusible substance inside the measuring cup into the infusion bag.

3. The tea machine for filling tea bags of claim 2, the tea machine further comprising a canister housing lid connected to the canister housing; and a canister selector attached to the canister housing lid to select the canister for dispensing the infusible substance into the infusion bag.

4. The tea machine for filling tea bags of claim 2, wherein the infusion bag dispensing system is inside the machine and surrounded by a plastic wall.

5. The tea machine for filling tea bags of claim 4, further comprising a measuring cup window to observe the measuring cup which is inside the machine and surrounded by a plastic wall.

6. The tea machine for filling tea bags of claim 5, the tea machine further comprising a canister selector to select the canister can for filling into the infusion bag.

7. The tea machine for filling tea bags of claim 5, further comprising a plurality of control buttons, one of the control buttons for selecting the canister, one of the buttons for placing the infusion bag in a to be filled position, one of the buttons for dispensing the infusible substance into the measuring cup, one of the buttons for dispensing the infusible substance from the measuring cup into the infusion bag; one of the buttons for releasing the filled infusion bag.

8. The tea machine for filling tea bags of claim 7, further comprising a water supply for providing water to make tea; a heater to heat the water to make tea; a cup sensor to detect a cup; and a control button for adding hot water into the cup to make tea.

9. The tea machine for filling tea bags of claim 8, wherein the water supply is one of a water tank to be filled manually and a water inlet connected to a water pipe automatically providing water to the tea machine.

10. The tea machine for filling tea bags of claim 5, further comprising a microprocessor; and motorized tea selector.

11. The tea machine for filling tea bags of claim 10, further comprising user interface to enable a user to interact with the microprocessor; and a computer display screen.

12. The tea machine for filling tea bags of claim 11, wherein the user interface includes a plurality of control buttons and the computer display screen is a small LCD screen.

13. The tea machine for filling tea bags of claim 11, wherein the tea machine allows the users to program their own tea mixture recipe using the user interface and save the tea mixture recipe for future use.

14. The tea machine for filling tea bags of claim 13, wherein the measuring cup measures the infusible substance by weight or by volume.

15. The tea machine for filling tea bags of claim 14, wherein the microprocessor enables the machine to dispense multiple substances, of same or different sizes, from different canisters into the infusion bag.

16. The tea machine for filling tea bags of claim 15, wherein the tea machine according to a selected saved tea mixture recipe selects the canister of choice, dispenses a fixed amount of the substance into the measuring cup, dispenses the substance to the infusion bag, repeating the same steps for another canister until the recipe is completed, and releases the infusion bag for use.

\* \* \* \* \*